(12) United States Patent
Bagajewicz et al.

(10) Patent No.: US 9,550,144 B2
(45) Date of Patent: Jan. 24, 2017

(54) TREATMENT OF NATURAL GAS TO REMOVE CONTAMINANTS

(71) Applicant: The Board of Regents of the University of Oklahoma, Norman, OK (US)

(72) Inventors: Miguel Bagajewicz, Norman, OK (US); Quang Nguyen, Norman, OK (US); Tu Oanh Tran, Norman, OK (US); Conner Cruson, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 0 days.

(21) Appl. No.: 15/007,814

(22) Filed: Jan. 27, 2016

(65) Prior Publication Data

US 2016/0184768 A1   Jun. 30, 2016

Related U.S. Application Data

(63) Continuation-in-part of application No. 14/757,796, filed on Dec. 23, 2015, now abandoned.

(60) Provisional application No. 62/096,615, filed on Dec. 24, 2014.

(51) Int. Cl.
*B01D 53/14* (2006.01)
*C10L 3/10* (2006.01)

(52) U.S. Cl.
CPC ....... *B01D 53/1462* (2013.01); *B01D 53/1425* (2013.01); *C10L 3/103* (2013.01); *C10L 3/104* (2013.01); *C10L 3/105* (2013.01); *C10L 3/108* (2013.01); *B01D 2252/103* (2013.01); *C10L 2290/06* (2013.01); *C10L 2290/10* (2013.01); *C10L 2290/12* (2013.01); *C10L 2290/48* (2013.01); *C10L 2290/541* (2013.01); *C10L 2290/543* (2013.01); *C10L 2290/545* (2013.01)

(58) Field of Classification Search
CPC ............... B01D 2252/103; B01D 53/1425; B01D 53/1462; C10L 2290/12; C10L 2290/541; C10L 3/103; C10L 3/104; C10L 3/105; C10L 3/108

See application file for complete search history.

(56) References Cited

U.S. PATENT DOCUMENTS

| | | | |
|---|---|---|---|
| 5,434,330 A | 7/1995 | Hnatow et al. | |
| 6,028,234 A | 2/2000 | Heinemann et al. | |
| 7,932,423 B2 * | 4/2011 | Shepherd | C10L 3/10 585/15 |

\* cited by examiner

*Primary Examiner* — Duane Smith
*Assistant Examiner* — Cabrena Holecek
(74) *Attorney, Agent, or Firm* — Hall Estill Law Firm

(57) ABSTRACT

A method of treating natural gas to remove contaminants is described. An input natural gas is mixed with water causing formation of $CO_2$ hydrates and $CH_4$ hydrates. A natural gas having a reduced $CO_2$ concentration, and a water-hydrate mixture comprising the $CO_2$ hydrates and $CH_4$ hydrates, is output. The water-hydrate mixture is exposed to $CO_2$ gas forming a $CO_2$—$CH_4$ gas mixture and a residual hydrate mixture. The $CO_2$—$CH_4$ gas mixture is recycled to remove $CH_4$. The residual hydrate mixture is treated to produce $H_2O$ which can be recycled for use in forming the water-hydrate mixture, and gaseous $CO_2$ for use in use in stripping $CH_4$ from the $CH_4$ hydrates of the water-hydrate mixture.

6 Claims, 4 Drawing Sheets

TREATMENT OF NATURAL GAS TO REMOVE CONTAMINANTS

CROSS-REFERENCE TO RELATED APPLICATIONS

The present application is a continuation-in-part of U.S. Ser. No. 14/757,796, filed Dec. 23, 2015, which claims priority under 35 U.S.C. §119(e) to U.S. Ser. No. 62/096,615, filed Dec. 24, 2014, the entirety of which are hereby expressly incorporated by reference herein.

BACKGROUND

Conventional technology of natural gas processing requires many separation steps, from acid gas removal ("sweetening") to heavier hydrocarbon recovery, nitrogen rejection and drying. Before the natural gas is delivered for urban and industrial use or LNG production, among other uses, usually the natural gas liquids (NGLs) such as ethane and C3+ hydrocarbons are also separated for other uses. The biggest drawback of the conventional gas processing is that these steps demand large consumption of energy. Gas processing is usually done by exposure of the natural gas to amines to remove acid gases ($CO_2$ and $H_2S$), glycol units to remove non condensable water, and membranes to remove nitrogen, for example. In turn, NGLs are separated using costly cryogenic processes.

In conventional gas conditioning technologies, several step-wise processes are required to isolate the many constituents of natural gas coming from the wellhead. Water comes with the oil and gas when exiting the well, so the first process is the removal of the liquid water. Following flash separation, the natural gas stream is sent to an amine unit where hydrogen sulfide and carbon dioxide are removed (the "sweetening" step). It is important to remove acid gases such as these due to their toxic, corrosive nature. In addition, many components, especially $CO_2$ alter the heating value of natural gas and their composition is regulated. A common side process directs the isolated acid gases containing $H_2S$ to a Claus unit where sulfur can be recovered in its elemental form. The now sweetened natural gas then has to be dehydrated. Usually, the next step is nitrogen removal using either pressure-swing adsorption, or membranes. Although nitrogen is not corrosive, its removal is still needed since $N_2$ lowers the heat value of the natural gas. After nitrogen rejection, the natural gas is primarily composed of hydrocarbons ranging from methane up to pentane and minor amounts of heavier hydrocarbons up to octane. Although these are typical components found in natural gas, the exact gas make-up depends highly on its source. Methane is the primary component of natural gas that is sold to consumers, so it is isolated next using a cryogenic distillation process, called a demethanizer unit. The methane-free natural gas liquids are then sent to an ordinary fractionation column, called a deethanizer, to recover ethane in the distillate followed by at least two other columns to separate heavier components (propane, butane, pentanes, and sometimes heavier hydrocarbons). Clathrate hydrate formation has been employed previously in certain treatments of natural gas.

As noted above, a major drawback of conventional gas processing (for example removal of acid gases by amines) is that these steps demand large consumption of energy. A method for purification of natural gas which consumes considerably less energy and significantly reduces the operation costs and loss of methane conventionally involved in removal of contaminant gases, and which is more environmentally-friendly, would be desirable. It is to such a method that the present disclosure directed.

BRIEF DESCRIPTION OF THE DRAWINGS

Several embodiments of the present disclosure are illustrated in the appended drawings. It is to be noted however, that the appended drawings only illustrate several typical embodiments and are therefore not intended to be considered limiting of the scope of the present disclosure. The figures are not necessarily to scale and certain features and certain views of the figures may be shown as exaggerated in scale or in schematic in the interest of clarity and conciseness.

DETAILED DESCRIPTION

Figure 1:
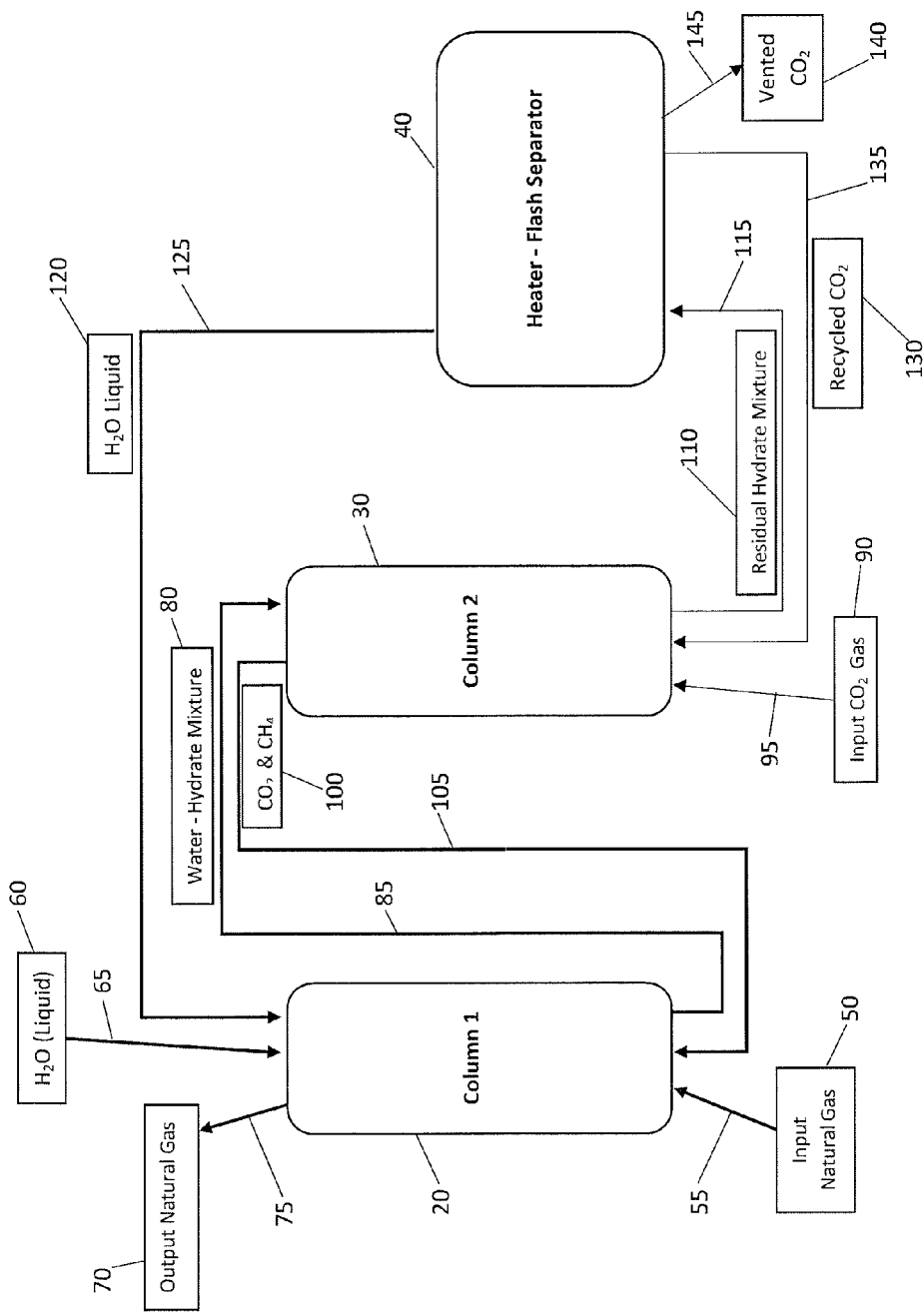
FIG. 1 is a schematic diagram of a natural gas treatment system and process constructed in accordance with the present disclosure.

Before describing various embodiments of the present disclosure in more detail by way of exemplary description, examples, and results, it is to be understood that the present disclosure is not limited in application to the details of methods and compositions as set forth in the following description. The methods of the present disclosure are capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the methods of the present disclosure may be practiced without these specific details. In other instances, features which are well known to persons of ordinary skill in the art have not been described in detail to avoid unnecessary complication of the description.

Unless otherwise defined herein, scientific and technical terms used in connection with the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the methods of the present disclosure pertain. All patents, published patent applications, and non-patent publications referenced in any portion of this application are herein expressly incorporated by reference in their entirety to the same extent as if each individual patent or publication was specifically and individually indicated to be incorporated by reference.

All of the apparatus, compositions and methods of production and application thereof disclosed herein can be made and executed without undue experimentation in light of the present disclosure. While the methods and components of the present disclosure have been described in terms of particular embodiments, it will be apparent to those of skill in the art that variations may be applied to the methods and/or components in the steps or in the sequence of steps of the methods described herein without departing from the concept, spirit and scope of the methods of the present disclosure. All such similar substitutes and modifications apparent to those of skilled in the art are deemed to be within the spirit, scope and content of the present disclosure.

As utilized in accordance with the methods and compositions of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one" when appropriate for the context in which the term is used. The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or greater or any integer inclusive therein. The term "at least one" may extend up to 100 or 1000 or more, depending on the term to which it is attached; in addition, the quantities of $^{100}/_{1000}$ are not to be considered limiting, as higher limits may also produce satisfactory results. In addition, the use of the term "at least one of X, Y and Z" will be understood to include X alone, Y alone, and Z alone, as well as any combination of X, Y and Z.

As used in this specification and claims, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unstated elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the term "about" is used to indicate that a value includes the inherent variation of error for the component or method step. Further, in this detailed description and the appended claims, each numerical value (e.g., temperature, pressure, or time) should be read once as modified by the term "about" (unless already expressly so modified), and then read again as not so modified unless otherwise indicated in context. Also, any range listed or described herein is intended to include, implicitly or explicitly, any number within the range, particularly all integers, including the end points, and is to be considered as having been so stated. For example, "a range from 1 to 10" is to be read as indicating each possible number, particularly integers, along the continuum between about 1 and about 10. Thus, even if specific data points within the range, or even no data points within the range, are explicitly identified or specifically referred to, it is to be understood that any data points within the range are to be considered to have been specified, and that the inventors possessed knowledge of the entire range and the points within the range.

As used herein, the term "substantially" means that the subsequently described event or circumstance completely occurs or that the subsequently described event or circumstance occurs to a great extent or degree. For example, the term "substantially" means that the subsequently described event or circumstance occurs at least 90% of the time, or at least 95% of the time, or at least 98% of the time.

Described herein are embodiments of novel methods of natural gas purification, particularly in regard to removal therefrom of gaseous contaminants such as $CO_2$, $H_2S$, and $N_2$. More specifically, certain embodiments of the present disclosure are directed to methods which use clathrate hydrate formation to deplete and/or remove contaminating gases such as $CO_2$, $H_2S$, and $N_2$ from natural gas without the requirement of the large energy consumption typical of conventional methods of natural gas purification. Other embodiments of the present disclosure include separating ethane and heavier alkanes (e.g., $C_3$-$C_{10}$) from the natural gas-water mixture.

The novel technology is based on the formation of natural gas hydrates in a multistage process in such a way that the methane losses and energy consumption are minimal (for example, as compared to conventional methods which are uneconomical because of the large energy consumption). In at least one non-limiting embodiment of the present disclosure, described in more detail below, $CO_2$ gas present in a natural gas feed at a composition of 9% is reduced to 1%, which is below the EPA standard of 2%, resulting in an estimated 69% reduction in operating costs versus a unit using conventional amine-based purification.

EXAMPLES

The methods of the present disclosure, having now been generally described will be more readily understood by reference to the following examples and embodiments, which are included merely for purposes of illustration of certain aspects and embodiments of the present disclosure, and are not intended to be limiting. The following detailed examples of methods are to be construed, as noted above, only as illustrative, and not as limitations of the present disclosure in any way whatsoever. Those skilled in the art will promptly recognize appropriate variations from the various structure, components, procedures and methods.

Example 1

A non-limiting embodiment of the present disclosure is presented in FIG. 1, wherein a natural gas treatment system 10 is exemplified. The natural gas treatment system 10 has a first column (first processing unit) 20, a second column (second processing unit) 30 which is in fluid communication with the first column 20, and a heater-flash separator unit 40 (which may comprise separate "heater" and "separator" components, or components combined into a single unit) which is in fluid communication with both the first column 20 and the second column 30. "Sour" input natural gas (i.e., containing gases such as $CO_2$ and $H_2S$, and typically having a $CO_2$ gas concentration in excess of 2%) 50 and water ($H_2O$) 60 are fed into the first column 20, via paths 55 and 65, respectively, where they are mixed in a mixing step to form a natural gas-water mixture, wherein the sour gases such as $CO_2$, $N_2$, and $H_2S$ mix with the water to form hydrate crystals comprising, for example $CO_2$ hydrates.

Output natural gas 70, which now has a reduced sour gas concentration (e.g., <2% $CO_2$) due to the capture of the $CO_2$ as hydrates, is removed from the first column 20 via path 75. Simultaneously, a water-hydrate mixture 80 which contains the formed $CO_2$ hydrates (as well as other hydrates of contaminant gases) is removed from first column 20. The water-hydrate mixture 80 may also contain $CH_4$ hydrates formed from the $CH_4$ in the input natural gas 50 and this $CH_4$ can be recovered from the water-hydrate mixture 80 which is taken from the first column 20 by inputting it into the second column 30 via path 85. In this recovery step, input CO2 gas 90 is delivered into the second column 30 via path 95 and is mixed with the water-hydrate mixture 80. Upon contacting the $CH_4$ hydrates, the $CO_2$ gas displaces ("strips") the $CH_4$ from the $CH_4$ hydrates if the water-hydrate mixture 80 causing formation of a $CO_2$—$CH_4$ gas mixture 100. This $CO_2$—$CH_4$ gas mixture 100, which is in effect a second "sour input natural gas" mixture, is recycled to the first column 20, via path 105 from the second column 30, for retreatment. Meanwhile, a residual hydrate mixture 110 comprising water, $CO_2$ hydrates, and some $CH_4$ hydrates is removed from the second column 30 and is sent via path 115 to the heater-flash separator 40 where water and $CO_2$ are separated for reuse or disposal.

The water is cooled to a liquid water 120 which is then either removed from the system or is recycled back to the first column 20 via path 125 for reuse. Gaseous $CO_2$ which is separated in the heater-flash separator 40 can be either used as recycled $CO_2$ 130 which is sent back to the second column 30 via path 135 for use again in stripping $CH_4$ from the water-hydrate mixture 80 or can be disposed of in an alternate manner as vented $CO_2$ 140 via path 145 or via another method. In the embodiment shown in FIG. 1, two separate columns (first column 20 and second column 30) are indicated, however in an alternate embodiment the processes which occur in the first column 20 (first processing unit) and the second column 30 (second processing unit) may be performed in a compartmentalized single column 150 so that those steps which occur separately in the first column 20 and the second column 30 in the embodiment of FIG. 1 occur within separate compartments the single column 150 (see FIG. 3).

Example 2

Figure 2:
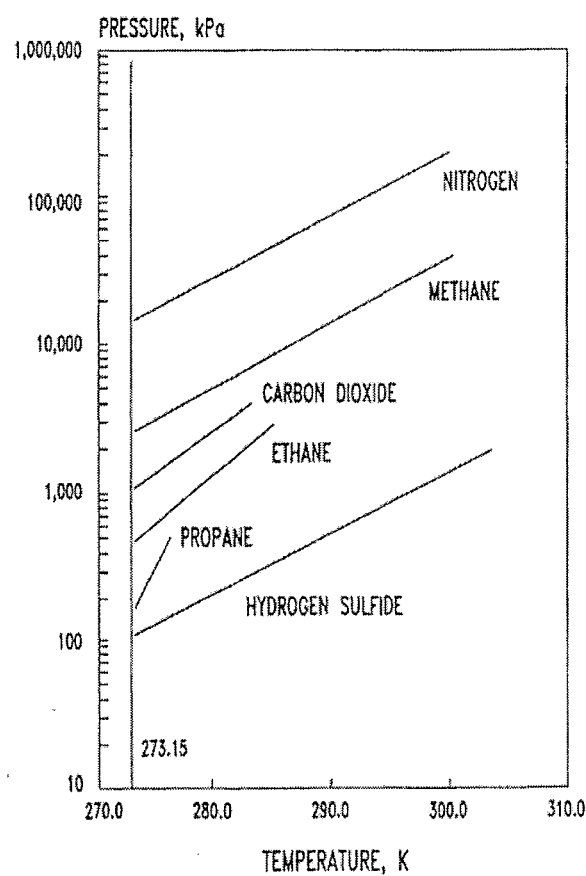
FIG. 2 is a graphical depiction showing hydrate formation lines for several components of natural gas.

FIG. 2 contains information on hydrate formation pressure and temperature conditions of typical components in natural gas (taken from Laddha, G. S, and Degaleesan, T. E., *Transport Phenomena in liquid extraction*; McGraw-Hill: New York 1978, 222-255). The data in FIG. 2 can be used in certain embodiments to select operating conditions to achieve high separation selectivity.

In certain embodiments, natural gas can be transported to a processing plant at a pressure in a range of, for example, 3000 KPa to over 7000 KPa. This high pressure range is ideal to form hydrates and thus can be used as the inlet gas pressure for the natural gas treatment system described herein.

Another parameter which can b e used herein for the separation scheme of natural gas is the gas solubility in water. Natural gas solubility data are listed in Table 2 below. The solubility of gas in water correlates to the "clathratability" of natural gas. The more a gas can dissolve in water, the more likely it will form hydrate. Hence, by examining the solubility and the thermodynamics of gases, one can gain insight into why certain gases are more stable in hydrate forms than others.

There is a sharp separation of $CO_2$ and $H_2S$ from the hydrocarbon gases and $N_2$ because the solubilities of $CO_2$ and $H_2S$ are about 60 and 200 times larger than $N_2$ and other nonpolar hydrocarbons, respectively. The isolation of different types of hydrocarbon gases would be more difficult since their solubility in water is very similar. From both the P-T graph in FIG. 2 and the solubility table in Table 2, it can concluded that, although it forms hydrates, nitrogen tends to stay more in vapor phase than in hydrate phase (the $N_2$ line is far above the methane line). Therefore, in order to separate nitrogen together with $CO_2$ and $H_2S$ gases, they should be clathrated at different temperature and pressure conditions. If the conditions are such that nitrogen stays mostly in the gas phase, then the resulting hydrocarbon and nitrogen mixture can be treated at different conditions to separate nitrogen. Similar considerations can be made to separate ethane and higher alkanes form methane.

Figure 3:
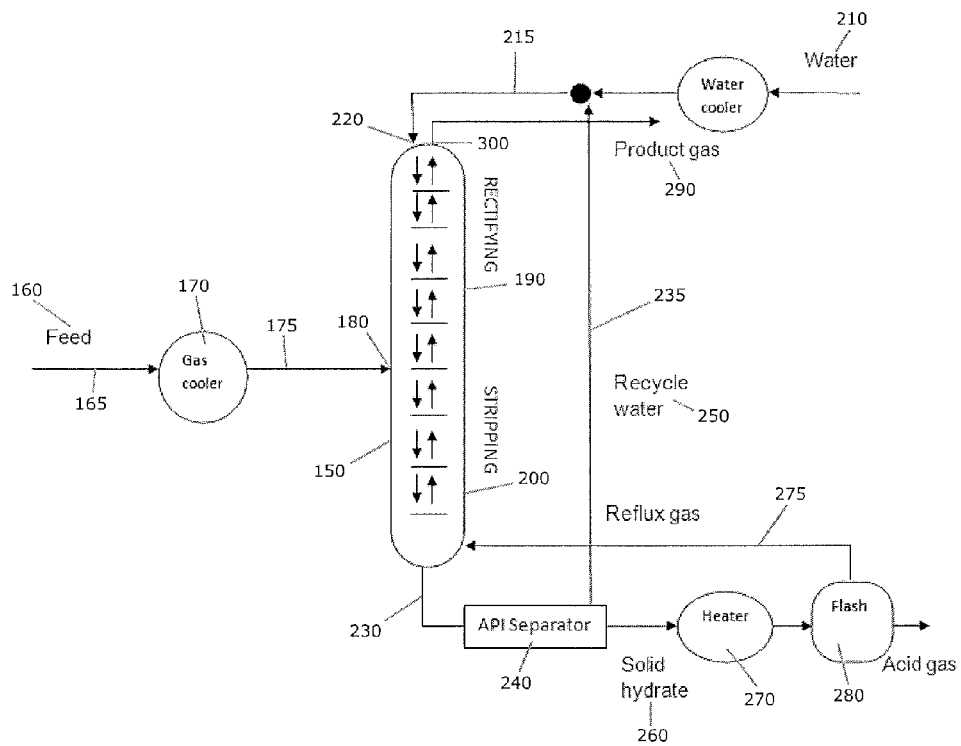
FIG. 3 is a schematic diagram of a column and gas separation scheme in accordance with the present disclosure.

Both the hydrocarbon gases and the non-combustible gases are able to form hydrates at hydrate forming conditions. Thus, in certain embodiments of the present disclosure, a multistage separation unit 150 is desired to achieve the necessary separation. FIG. 3 shows a generalized separation scheme 150 for natural gas conditions. Feed 160 is fed into a gas cooler 170 via a path 165 and then to a feed location 180 via path 175. The natural gas feed location 180 divides the column 150 into two main sections 190 and 200. The section above the feed 180 is a methane rectifying section 190 and the section below the feed 180 functions as a stripping section 200. Pure water 210 enters the column 150 from the top 220 via path 215 and the gas is brought into contact with water in a counter-current fashion. This is essentially equivalent to the two columns of FIG. 1, except that the column 150 in FIG. 3 combines the features of the two columns (first column 20 and second column 30) of FIG. 1 into a single column 150.

The hydrate/water stream 230 then leaves the column 150 and is sent to a separator 240, such as an API separator, where the hydrates are separated from the water. The water 250 is then recycled to the top of the column 150 via path 235, and the hydrate crystals 260 are heated by a heater 270 and decomposed. The leftover water is cooled down and sent to the top 220 of the column 150, before a makeup (or a purge, depending on the water content of the feed and the water losses with the acid gas) is added. A portion of the recovered acid gas stream returns to the column 150 as a reflux via path 275 from a flasher 280 to allow methane stripping. Finally, the product gas 290 exits the column 150 from the top stage 300. Heating and cooling tasks are only indicated (a heat exchanger network and the allocation of utilities is added in another embodiment).

Figure 4:
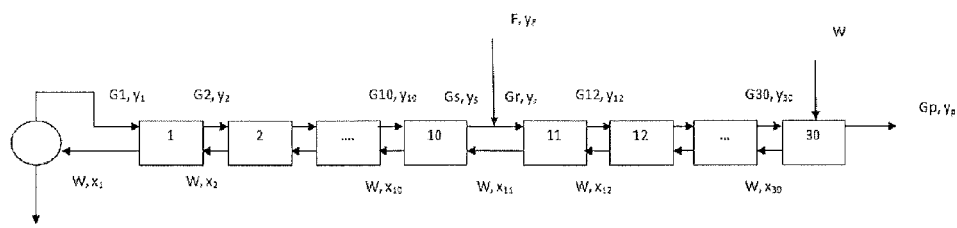
FIG. 4 is a diagram of a $CO_2$ removal stage process.

Below, this design is modeled mathematically with a system of algebraic equations of the material balances in each stage. The nomenclature of this model is consistent with the block diagram in FIG. 4. The thermodynamic model is used to relate the vapor phase composition to the hydrate phase composition.

A brief summary of the algebraic equation system includes:

1. In each stage, the mass balance is: $G_n y_n + W x_{n+1} = W x_n + G_{n+1} y_{n+1}$
2. The gas-hydrate phases relationship is determined thermodynamically as: $y_{n+1} = K x_n$
3. Assuming there is no water escape to the vapor phase, the gas flow-rates in stages are interrelated:
   In the rectifying section: $G_n = G_r - W[(\Sigma x_{11}) - \Sigma x_n)]$ and $G_r = F + G_s$
   In the stripping section: $G_n = G_1 - W[((\Sigma x_1) - (\Sigma x_n)]$
4. The reboiler is a full reboiler, hence: $G_1 = W(\Sigma x_1) * \alpha$ ($\alpha$ is the reboiler reflux ratio)

Removal of $CO_2$

In this example, only $CO_2$ removal from methane ($CH_4$) was examined. The feed gas composition is shown in Table 1. The block diagram in FIG. 4 was used to model the $CO_2$ removal unit. The process comprised 30 stages in which stages 1-10 made up the stripping section and stages 11-30 were the rectifying section. Table 2 summarizes the results of the $CO_2$ removal performance. In Table 2, C1, C2, C3, and iC4 represent hydrocarbons with one, two, three, and four carbons, respectively.

TABLE 1

Gas Components and Conditions

| Components | Composition |
|---|---|
| $CH_4$ | 0.905 |
| $CO_2$ | 0.095 |
| Flow-rate (lbmole/hr) | 62464 |
| Pressure (psia) | 580 |
| Temperature (K) | 298 |

TABLE 2

CO₂ removal unit results

| Operation conditions | | Components | Feed composition | Product gas composition | Acid gas composition | Hydrocarbon recovery |
|---|---|---|---|---|---|---|
| Pressure | 4000 KPa | C1 | 0.897 | 0.972 | 0.024 | 99.8% |
| | | C2 | 0.007 | 0.008 | 0.001 | 98.6% |
| | | C3 | 0.001 | 0.001 | 0.005 | 70.2% |
| | | iC4 | 0.0002 | 0.0001 | 0.0024 | 20.3% |
| Temperature | 280 K | $CO_2$ | 0.094 | 0.019 | 0.968 | |
| | | Flow-rate | 63030 lbmoles/hr | 58067 lbmoles/hr | 4964 lbmoles/hr | |

The stronger affinity of $CO_2$ to the hydrate phase results in a satisfactory reduction of the acid gas composition from about 9% to about 1% using 30 stages; at 280 K and 4000 KPa. The water/feed gas ratio is 5; meaning the water flow-rate is 5 times that of the feed gas flow-rate. At this condition, feed gas from pipeline can be directly transferred to the separation unit without further recompression. In one aspect, in this example, some loss of propane and iso-butane occurs.

Figure 5:
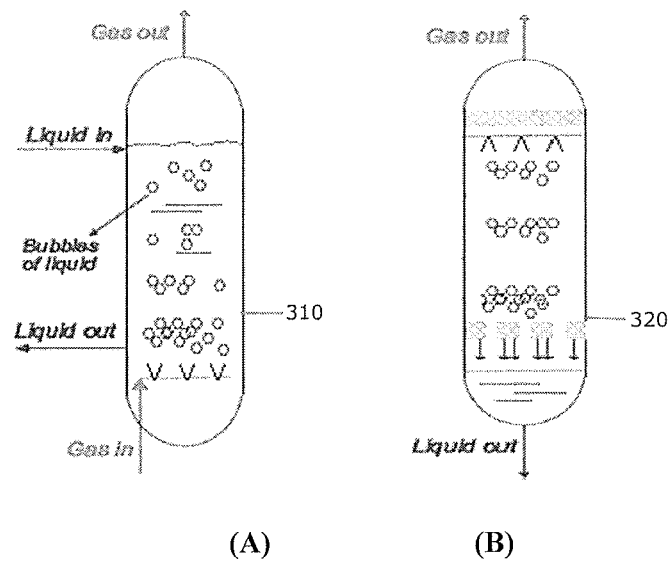
FIG. 5 is a schematic representation of two column design options.

The mass transport characteristics of gas to liquid water are taken into account in designing the columns where hydrate formation takes place. FIG. 5 shows at least two design options for the hydrate forming reactor: (A) a bubble column 310, and (B) a spray column 320. While the bubble column is popular in lab scale study, spray columns are more commonly used in larger scale production. A third alternative is a column with stages, each stage being a bubble column. As explained previously, hydrate formation usually occurs at the vapor-liquid interface for two main reasons: (1) at the interface the Gibbs energy of nucleation is minimized, and (2) the concentration of the hydrate forming gas is highest at this location. Hence, the interfacial area between gas and liquid is an important factor in the growth process. In a bubble column, when hydrates start to populate in the column, some tend to float in water due to their similar density to ice, while others have density higher than water and sink. Hence, this build-up layer of hydrate can adversely affect the mass diffusion at the interface. Spray columns, however, facilitate this mass transfer mechanism by providing multiple water droplets at once, giving adequate contact area for hydrate formation.

Figure 6:
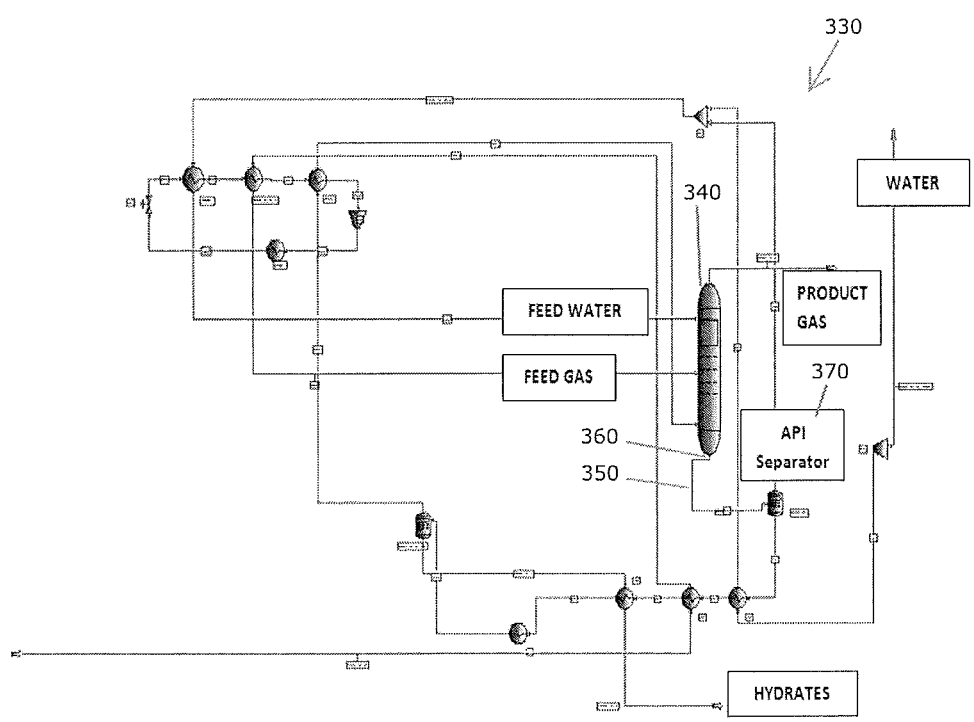
FIG. 6 is a schematic representation of a $CO_2$ removal process simulation in Pro/II.

After the stage by stage calculations were performed, a simulator was used to obtain exact material balances. An embodiment of the process of the present disclosure, including heat integration, as represented by Pro/II simulation is shown in FIG. 6 as numeral 330. In one embodiment, the hydrate column 340 height is determined using experimental mass-transfer correlations developed by Laddha et al (op. cit). An appropriate diameter is chosen that ultimately determines the height of the individual stages, and the column as a whole.

The stream 350 exiting the bottom 360 of the column 340 is a mixture of hydrates and excess water, so in at least one embodiment the extra water is sent to an API separator 370. Some excess water is sent to the heater with the hydrates. Hydrate water is estimated based on the ratio of mole gas/mole water in one unit cell; for methane this ratio is 5.67; for the other gases, if assuming that they only occupy the large cages in sII hydrates, this ratio is 17. The hydrate water is then computed by multiplying the gas molar flow-rates by the gas/water ratios; and with this method, the calculated amount also account s for some excess water.

Table 3 shows a compilation of the fixed costs for the process of the present disclosure according to a single example of the process embodied in Example 2 (wherein the processes of first column 20 and second column 30 of FIG. 1 are combined into a single column).

TABLE 3

Hydrate unit equipment costs ($CO_2$ as only acid gas).

| | Column | MOC | Pressure (kPa) | Diameter (m) | Height (m) | |
|---|---|---|---|---|---|---|
| 2 | Vertical tower | Carbon steel | 4000 | 2 | 34.5 | $ 374,746 |
| | API unit | MOC | Pressure (kPa) | Capacity (m³) | | |
| 1 | Storage tank | Carbon steel | 6340 | 1.8 | | $ 32,465 |
| | Heater | MOC | Pressure (kPa) | Area (m²) | | |
| 1 | HX | Carbon steel | 6340 | 43.8 | | $ 13,226 |
| | First batch water | Type | Holdup (m³) | Cost ($/m³) | | |
| 1 | | | 108 | 0.6 | | $ 65 |
| | Refrigerant | Type | Holdup (m³) | Cost ($/lb) | | |
| 1 | R12 | Light HC | 18.7 | 22 | | $1,216,558 |
| | Compressor | MOC | Pressure (psi) | Work (kW) | | |
| 2 | Centrifugal | Carbon steel | 80 and 920 | 14095 | | $3,276,000 |
| | Exchangers | MOC | Pressure (kPa) | | | |
| 9 | HX | Carbon steel | | 4500 | | $ 693,000 |
| | Flash drum | MOC | Pressure (kPa) | | | |
| 1 | Storage tank | Carbon steel | 6340 | | | $ 72,143 |
| | Total | | | | | $5,678,203 |

Operation costs include, for example, the water that needs to be regenerated due to losses in product streams, electricity costs for the pump and compressor, and natural gas for the heater. For this design, the heater should be able to raise the gas hydrates to their corresponding dissociation temperature. The temperature selected was 300 K for the present example. For comparative purposes, natural gas at $5/MMBTU was used in the heater. The heater temperature is below ambient temperature, thus low pressure steam or any waste heat can substitute as a heat source. The price of electricity is the same as the value for the amine unit, $0.07/kWh. Table 4 details the operation costs in this embodiment.

TABLE 4

Operation cost ($CO_2$ as only acid gas)

| | Duty (MMBTU/hr) | Price ($/MMBTU) | Cost ($/year) |
|---|---|---|---|
| Heating Utility | 61.8 | 5 | $2,700,000 |
| | Work (kW) | Cost ($/kWh) | |
| Electricity | 14,094 | 0.07 | $8,600,000 |
| | Flow (Mft3/hr) | Cost ($/Mft3) | Cost ($/year) |
| Methane Lost | 88 | 4 | $3,100,000 |
| Total | | | $14,400,000 |

The total annualized costs of the present hydrate technology in this embodiment are much less than the corresponding costs of the conventional amine unit. For example, when $CO_2$ is the only gas removed, the total annualized operating costs for an amine unit, using a 15 year basis, are calculated to be $47,248,989, while the total annualized operating costs for a treatment system of the present disclosure which uses hydrate technology, using a 15 year basis, are calculated to be $14,778,547, resulting in a savings of 69%.

In one embodiment of the present disclosure, the size of a gas hydrate unit is made dependent on the kinetics of a hydrate formation. For example, Vysniauskas and Bishnoi (Vysniauskas, A.; Bishnoi, P. R. A kinetic study of methane hydrate formation. *Chem. Eng. Sci.* 1983, 38 (7), 1061-1072) provide an equation that correlates the pressure, temperature, and interfacial surface area to the reaction rate. They operated in a range of 10-100 bar and a temperature range of 274 to 284K. In this example, a pressure of 90 bar and a temperature of 280K was selected. With this equation in hand, an individual stage was designed. To design a stage, bubbles of methane introduced towards the bottom of a column that gradually moves up the column were considered. The pressure and temperature of the system is such that hydrate formation is encouraged, and thus the bubble reduces in size as it moves up the column and hydrate crystals are formed. It's assumed the column is well stirred to prevent clustering of the methane into a single bubble and hydrate agglomeration. A steady state is also assumed so that methane hydrate formation is occurring at a constant rate.

To calculate the diameter, the cross-sectional area is considered. Within the area, a particular number of bubbles will be present with some radius. So as not to consider conglomeration of the bubbles, the bubbles are assumed to be separated by some factor. The diameter of the column is dependent on the radius of the bubble, the number of bubbles, and the amount of spacing desired between bubbles (in this case twice the total surface area of all bubbles in a small segment of the column is assumed). The number of bubbles is dictated by the radius of the bubbles and the total gas flow rate. In a truly hydrate forming operation, as the bubbles rise, they shrink in size (forming hydrates), thus the diameter of the column is set by the bottom of the column (where the bubbles are large), rather than the top of the column (where the bubbles are small). The length of the column can be determined by considering the change in the volume of a single bubble. This is a function of the velocity and the rate of reaction, which is a function of the surface area of the bubble. The velocity of the bubble and the area of the bubble are functions of the bubble volume. Thus, one can obtain the height of each stage.

In designing the column, the column diameter was fixed to a value of 2 meters, forcing a particular number of bubbles at some radius through the column. This means that to meet the flow rate for the stage (e.g., 120 kg/s in this example), more than one column was required. The results indicate that for these specifications in this example, the stage used six columns, each 2 meters wide, with a height of 8 meters. The radius of the bubble can be decreased further, increasing the number of columns needed and decreasing the height. Other embodiments with different numbers, sizes and columns are of course within the scope of the present disclosure. In addition to hydrate forming, steps and systems for hydrate decomposing can be included.

The description provided herein is intended for purposes of illustration only and is not intended to be construed in a limiting sense. Thus, while the present disclosure has been described herein in connection with certain embodiments so that aspects thereof may be more fully understood and appreciated, it is not intended that the present disclosure be limited to these particular embodiments. On the contrary, it is intended that all alternatives, modifications and equivalents are included within the scope of the present disclosure as defined herein. Thus the examples described above, which include particular embodiments, will serve to illustrate the practice of the present disclosure, it being understood that the particulars shown are by way of example and for purposes of illustrative discussion of particular embodiments of the present disclosure only and are presented in the cause of providing what is believed to be a useful and readily understood description of procedures as well as of the principles and conceptual aspects of the inventive concepts. Changes may be made in the formulation of the various components and compositions described herein, the methods described herein or in the steps or the sequence of steps of the methods described herein without departing from the spirit and scope of the present disclosure.

What is claimed is:

1. A method of purifying a natural gas, comprising:
combining an input natural gas and water in a first processing unit to form a natural gas-water mixture under conditions which cause formation of $CO_2$ hydrates and $CH_4$ hydrates;
removing from the first processing unit an output natural gas having a reduced $CO_2$ concentration;
removing from the first processing unit a water-hydrate mixture comprising the $CO_2$ hydrates and $CH_4$ hydrates;
exposing the water-hydrate mixture comprising $CO_2$ hydrates and $CH_4$ hydrates to an input $CO_2$ gas in a second processing unit causing displacement of $CH_4$ from the $CH_4$ hydrates and forming a $CO_2$—$CH_4$ gas mixture and a residual hydrate mixture;
recycling the $CO_2$—$CH_4$ gas mixture from the second processing unit to the first processing unit where the $CO_2$—$CH_4$ gas mixture is combined with the natural gas-water mixture; and
transferring the residual hydrate mixture from the second processing unit to a heater-separator unit producing $H_2O$ and gaseous $CO_2$, wherein at least a portion of the $H_2O$ is liquefied $H_2O$ which is recycled to the first processing unit for use in forming the water-hydrate mixture comprising $CO_2$ hydrates and $CH_4$ hydrates, and at least a portion of the gaseous $CO_2$ is recycled to the second processing unit for use in displacing $CH_4$ from the $CH_4$ hydrates of the water-hydrate mixture forming $CH_4$ gas.

2. The method of claim 1, wherein the output natural gas comprises <2% $CO_2$.

3. The method of claim 1, further comprising separating $H_2S$ and $N_2$ from the natural gas-water mixture.

4. The method of claim 1, further comprising separating ethane and heavier alkanes from the natural gas-water mixture.

5. The method of claim 1, wherein the first processing unit and the second processing unit are in separate columns.

6. The method of claim 1, wherein the first processing unit and the second processing unit are in a single column.

* * * * *